Oct. 29, 1940.     F. A. KING     2,219,322

FISHING REEL

Filed Jan. 24, 1938     3 Sheets—Sheet 1

Inventor:
F. A. King

Oct. 29, 1940.  F. A. KING  2,219,322
FISHING REEL
Filed Jan. 24, 1938   3 Sheets-Sheet 2
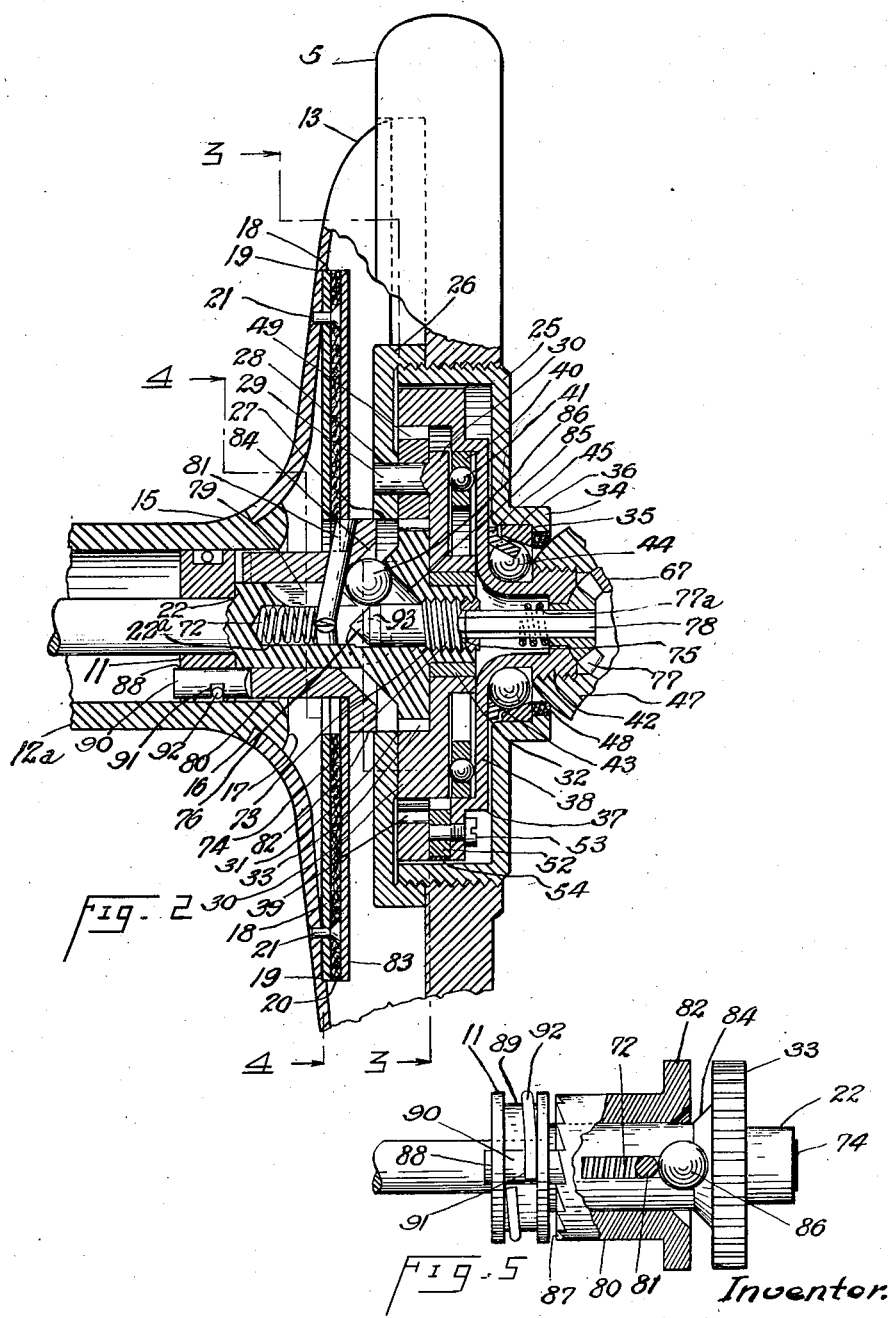

Oct. 29, 1940.   F. A. KING   2,219,322
FISHING REEL
Filed Jan. 24, 1938   3 Sheets-Sheet 3
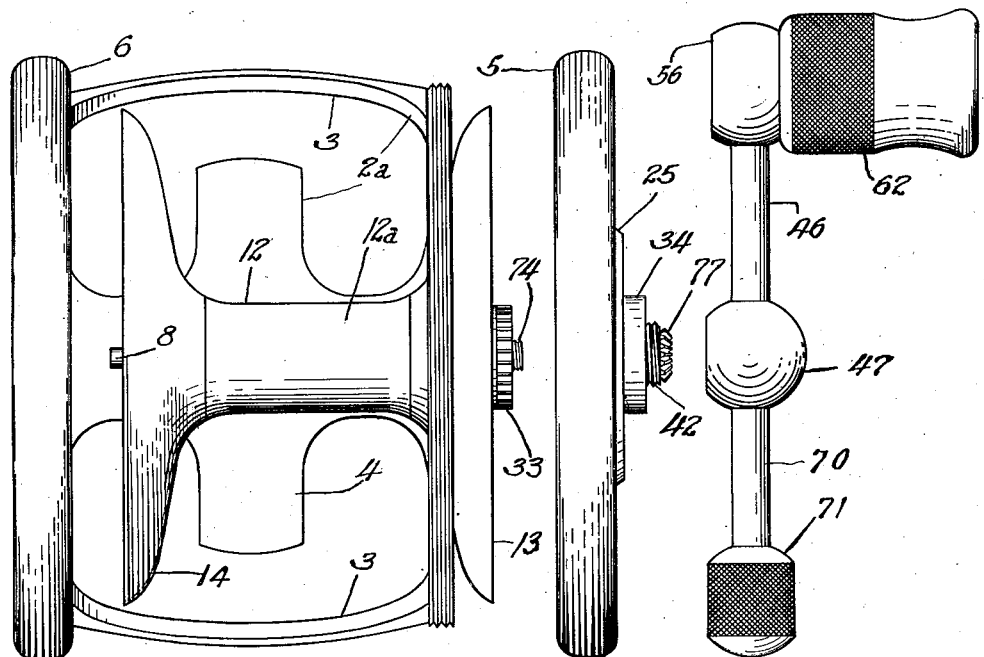
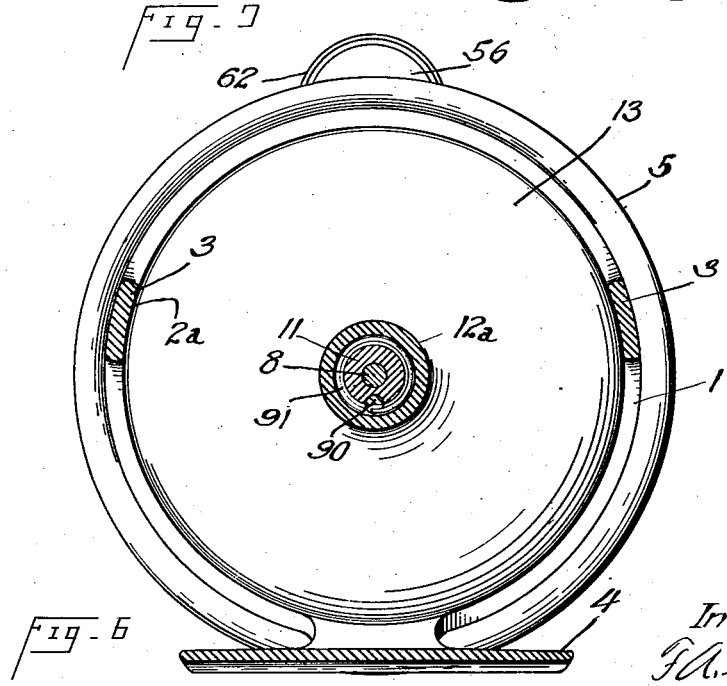
Inventor:
F. A. King Patented Oct. 29, 1940

2,219,322

UNITED STATES PATENT OFFICE 2,219,322

FISHING REEL

Frank A. King, Los Angeles, Calif.

Application January 24, 1938, Serial No. 186,643

18 Claims. (Cl. 242—84.5)

This invention relates to free spool fishing reels of the frictional; single clutch unit type and has reference more particularly to improvements in the construction of clutch controlling mechanism of the character described and claimed in my co-pending application, Ser. No. 46,747, filed October 25, 1935, and which application has resulted in Letters Patent No. 2,162,726, dated June 20, 1939. This invention differs from that described and claimed in the above identified patent primarily in the construction of the clutch and means employed for operating the same.

My present invention also contemplates further improvements in fishing reels of the class disclosed in my earlier Patent No. 2,054,823 of September 22, 1936.

The designing and construction of fishing reels of the single unit frictional clutch type, wherein the clutch is capable of functioning as a brake or a drag, has been found to involve some very difficult mechanical problems.

One object of this invention is to provide the screw mechanism with a ball action differentiating device in which the balls are moved by the screw element at a differentiating ratio with respect thereto and, in turn, transmitting this movement to the movable frictional clutch member in the same manner which, in other words, is at a diminishing ratio as it reaches the clutching stage, thus tending to approach a neutral movement. Obviously this construction facilitates the employment of relatively lighter adjusting mechanism and increases the sensitiveness of the drag adjustment.

Another important feature of this invention is the novel construction of a diaphragmatic acting frictional clutch unit, in combination with a symmetrically-designed spool head.

Still another object of this invention resides in the novel arrangements of the parts so as to incorporate quick take down features.

Other objects of this invention reside in especially designed means for rotatably supporting the crank, the spool driving gears, and the ratchet and pawl for restraining reverse movement of the spool shaft.

A further object of my invention is the provision of an automatic click which is disengaged by manipulation of the handle on the crank.

With these and other more detailed objects and advantages in view, the invention comprises certain novel constructions, combinations and arrangements of parts, as will be subsequently specified and claimed. For a full and more complete understanding of the invention, reference may be had to the following description and accompanying drawings, wherein:

Fig. 2 is an enlarged fragmental view similar to Fig. 1 showing the clutch mechanism in its fully engaged position.

Fig. 5 is a fragmental view showing the automatic click mechanism.

Fig. 6 is a cross sectional view taken on the line 6—6 of Fig. 1.

Fig. 7 is a view showing a group of assemblies as they appear when the reel is taken down for cleaning and oiling.

Figures 1, 3, 4:
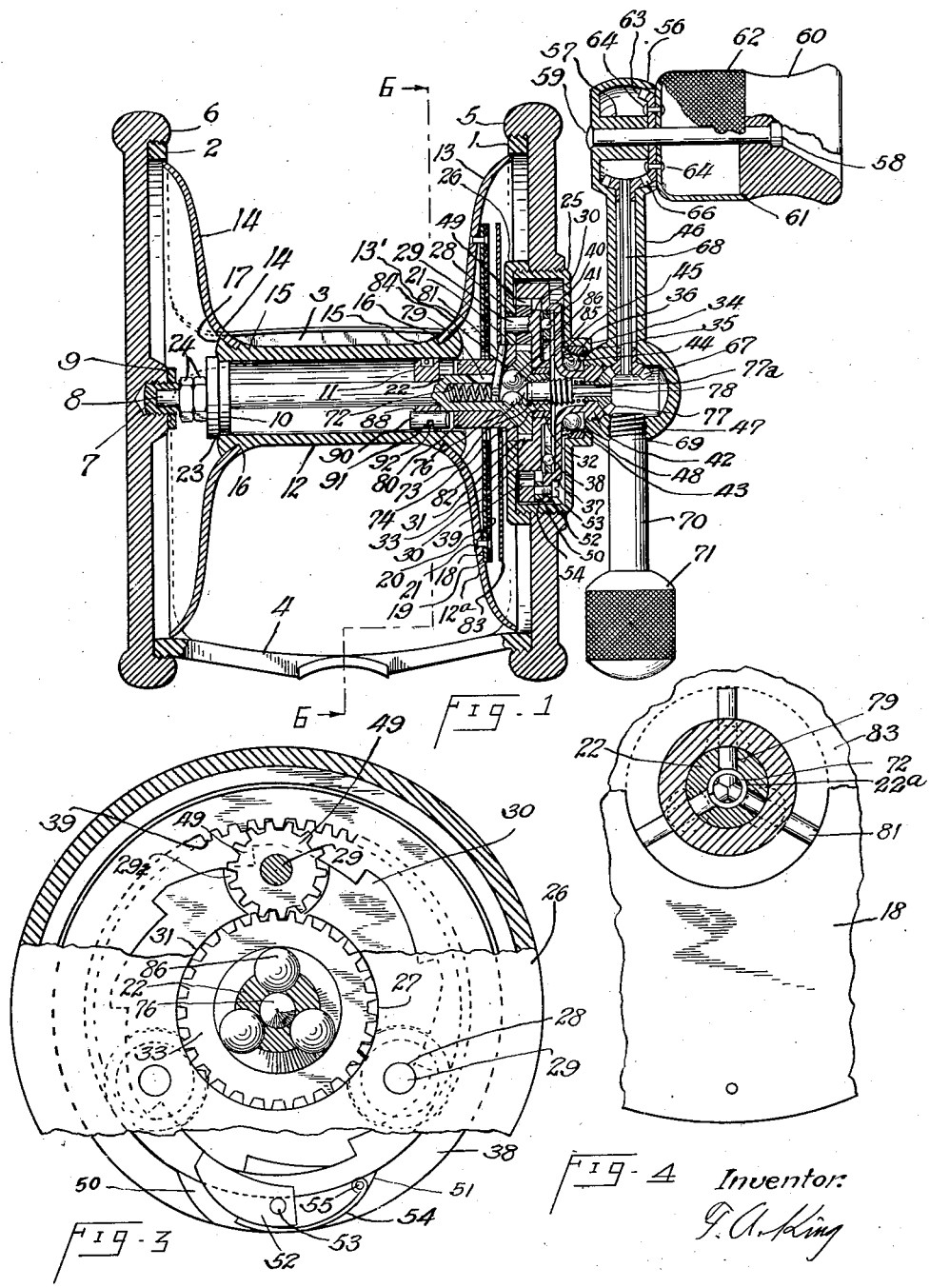
Fig. 1 is a longitudinal sectional view of a reel structure, made in accordance with this invention, showing the clutch mechanism in the free spool position, certain portions being indicated by dotted line.
Fig. 3 is a cross sectional view taken on the line 3—3 of Fig. 2, showing the drive gearing and a section of the spool shaft through the ball actuating mechanism.
Fig. 4 is a cross sectional view taken on the line 4—4 of Fig. 2.

While a preferred specific embodiment of the invention is herein set forth, it is to be understood that I am not to be limited to the exact construction illustrated and described, because various modifications of these details may be provided in putting the invention into practice, within the purview of the appended claims.

Throughout the following description and the various figures of the drawings, like reference characters denote corresponding parts.

The reel embodies a main housing or cage including exteriorly threaded end rings 1 and 2, which constitutes the frame 2a in which the spool is mounted. The rings 1 and 2 are spaced apart and integrally connected at multiple points, by means of outwardly curved pillars 3 and the reel seat 4, by which the reel is attached to the rod.

I provide internally threaded end caps 5 and 6 which are fabricated from any suitable material and they are removably threaded over the end rings 1 and 2 respectively. The tail cap 6 is provided with an internally threaded opening wherein is threaded a socket bearing 7, which rotatably supports the tail end of a spool shaft 8. The end of shaft 8 abuts the bottom of the socket bearing 7 and the latter is adjusted and secured in position by means of a lock nut 9. Shaft 8 extends through bearings 10 and 11 which rotatably support a tubular spool member 12.

The spool assembly 12a embodies oppositely disposed curved flanges 13 and 14 which are formed with inwardly facing flared hubs 13' and 14'. The hubs 13' and 14' are connected to the member 12 by means of flared end heads 15, oppositely disposed, which are provided with annular shoulder seats 16 formed at an angle corresponding to the radii of their curves. By this arrangement space is provided to provide ample metal at the outer extremities of the member 12 for peening or spinning over of the metal in the outer flared recess of the hubs 13' and 14', as indicated by numeral 17. Moreover, by this arrangement, the spool heads or flanges 13 and 14 are provided with concave central portions, one of which is utilized to carry a diaphragm disc 18 capable of a slight diaphragmatical action.

The concave or front face of flange 13 is provided with an annular recess 19 of relatively large diameter, wherein is seated the periphery of the disc 18. The outer face of the disc 18 is lined with any well known frictional facing 20 and the disc 18 and its lining are securely attached in the recess and to the flange 13 by means of rivets 21, whereby to rotate with the spool assembly 12a as a unit.

Bearing 11 is pressed in the hollow of the hub 12 and the head end of the spool shaft 8 is enlarged thus forming a cylindrical shaped head 22 the inner end of which abuts the outer side of bearing 11. Bearing 10 is provided with an annular shoulder 23 which abuts the outer end of hub 12, and a pair of lock nuts 24 are threaded and adjusted over the tail end of shaft 8 so as to permit free rotation of the spool assembly 12a thereon.

The head cap 5 is concentrically bored and internally threaded for the reception of an externally threaded cup shaped housing 25 which projects through the inner wall of cap 5 for the reception of an internally threaded cover 26, thus forming a gear housing.

With reference to Fig. 2, the cover 26 is concentrically bored at 27. Adjacent the annular marginal edge of the bore 27, the cover 26 is also provided with sockets or apertures 28, which are spaced 120 degrees apart wherein are located spindle studs 29 that are formed integral with a ratchet 30. The inner side of ratchet 30 is provided with an annular recess 31 corresponding to the bore 27 and it is also provided with a concentric opening which non-rotatably supports a bushing 32 which in turn rotatably supports the outer end of shaft 8 by means of the outer end of head 22.

Located in the recess 31 and abutting the inner side of bushing 32 is a spur gear 33 which is formed integral with the head 22, thus the shaft 8 is restrained against lateral movement between the bushing 32 and the bearing 7.

The housing 25 is formed with a hollow concentric boss 34 which is provided with an annular inner shoulder 35 that retains a ball race 36 therein.

Inclosed in the housing 25 is a ring gear carrier 38 which is provided with an annular marginal flange 37 carrying an internal gear 39, which in this instance has twice as many teeth as gear 33.

Interposed between the outer face of ratchet 30 and the inner face of the carrier 38 is a ball retainer 40 which is provided with a circle of spaced ball bearings 41 that are concentrically retained therebetween by means of the annular flange 37.

The outer face of carrier 38 is provided with an outwardly projecting exteriorly threaded shank or head 42, which is circumferentially undercut to form a ball race 43 thereon for balls 44, which are spaced apart by a retainer 45, and which balls serve to rotatably support the carrier 38 in the housing 25. It will be observed that the angles of the raceways 36 and 43 are of suitable angle to sustain both lateral and radial thrust, while the outer face of ratchet 30 and the inner face of carrier 38 are parallel, the balls 41 therebetween serving only to sustain lateral or end thrust. Obviously by this arrangement any lost motion or wear between carrier 38 and its bearings can easily be taken up through the medium of the threaded engagement between housing 25, cover 26, and the cap 5.

Numeral 46 designates a hollow crank that is formed integral with a hollow spherical hub 47 which is internally threaded over the threaded head 42, there being a felt washer seal 48 interposed between the hub 47 and the boss 34. Such threaded arrangement is right hand which corresponds with the cap 5 and the ring 1; but the threaded engagement between the housing 25, cover 26, and the cap 5 are left hand, therefore the torsional stresses from the crank 46 tend only to lock these parts in their respective places.

As shown in Fig. 3 the inner side of ratchet 30 is provided with multiple semicircular recesses 29a concentrically located with respect to the spindle studs 29, the latter of which rotatably support idler gears 49 in the recesses 29a.

Adjacent the gear 39 the carrier 38 is provided with a slot 50 having tangential curved end walls 51 which extend through the annular marginal wall of the carrier 38. Positioned in this slot 50 is a pawl 52 which is pivotally supported therein by a screw 53. A pawl spring 54 is securely retained in a pressure urging position through the medium of pin 55 and one of the curved walls 51, whereby the pawl 52 and the spring 54 co-act with the ratchet 30 when the carrier 38 is moved. The idler gears 49 are in mesh with gear 39 and the spool shaft gear 33. It will now be seen that rotation of the crank 46 in a right hand direction of travel will drive the carrier 38 through its threaded engagement therewith, and in turn the internal gear 39 on the carrier 38 will impart rotation to the idler gears 49 which will effect rotation of the spool shaft gear 33 and its integral shaft 8 in a direction of travel reverse to that of the crank.

The outer end of crank 46 is formed with a cup shaped gear housing 56 the inner portion of which is provided with an outwardly projecting boss 57. This boss is drilled to receive a crank handle pin 59 formed with a head 58 and which pin rotatably carries a handle comprising of an outer knob 60 having an inner annular shoulder 61, which is for the support of the outer end of a cupshaped knurled handle or ferrule 62 the bottom portion of which abuts the outer periphery of cup 56 thus serving as a cover therefor.

Abutting the outer end of boss 57 and the inner end of ferrule 62 is a bevel gear 63 which is secured to the end of ferrule 62 by rivets 64. In mesh with this gear 63 is a pinion gear 66 which is connected to a similar gear 67 in the hub 47 by means of a hexagon shaft 68 which, in assembling, is passed through the gears 66 and 67 and through the tubular crank 46 by way of a threaded opening 69 in the hub 47. This opening 69 serves to carry a counterarm 70 which is threaded in the opening and extends from the hub 47 diametrically opposite the crank, and which arm is formed integral with a knurled counterweight 71.

The head 22 is formed with a bore in which is mounted a compression spring 72, and the outer end of the bore is threaded as indicated at 73 for the reception of an adjusting screw 74. The outer end portion of the screw 74 is threaded with external right hand threads and is formed with a hexagon or splined socket 75, while the inner portion thereof is provided with a cone shaped point 76. The head 42 on the carrier 38 is formed with an inner chamber in which is journaled an adjusting gear 77. This gear is fitted by press fit, or otherwise, over the outer end of a hexagon or splined shaft 78 the opposite or inner end of which freely enters the socket 75. Interposed between the gear 77 and the threaded end of the screw 74 is a compression spring 77a which is retained over the shaft 78 by means of its own circular tension thereon, the function of which will later be described.

Adjacent the inner side of gear 33 the head 22 is provided with spaced slots or splines 79 running in the direction of its length, which slots intersect the bore 22a of the head 22 as illustrated in Figs. 4 and 5. Radial keys or pins 81 in the slots 79 serve to drive a clutch collar 80; the pins 81 being entered in the slots 79 through apertures in the collar 80 which registers with the slots 79 whereby the pins 81 are permitted to move laterally in the slots 79 as the collar 80 is moved longitudinally on the head 22.

The outer end of the collar 80 is provided with a flange 82 the inner side of which abuts a resilient frictional disc 83 which is apertured and slotted so as to fit over the collar 80 and the outer ends of the pins 81 and thus serves to retain the pins in place and to drive the disc 83 as a unit with the collar 80. The outer face of the flange 82 and the inner face of the gear 33 are formed with beveled portions 84 which correspond with each other, and the head 22 is drilled at right angle thereto, thus providing angular ball channels 85 which intersect the slots 79. The channels 85 carry clutch actuating balls 86 which are interposed between the bevelled face 84 on collar 80 and the cone point 76 of the adjusting screw 74.

As shown in Fig. 1 the inner end of threads of the screw 74 are fully disengaged from the outer end of the threads 73, yet, they are readily engageable with each other by means of the compression spring 77a, which functions to reengage screw 74 with the threads 73 when the screw 74 is rotated in the right hand direction of travel.

Obviously, rotation of the ferrule 62 with respect to the crank 46 will effect longitudinal movement of the screw 76 through the medium of the train of gears 63, 66, 67, 77 and their respective shafts 68 and 78 by reason of the threaded engagement between the head 22 and the adjusting screw 74, the latter being shiftably engaged with the inner end of shaft 78 through the hexagon socket 75.

As illustrated by Fig. 2, this longitudinal movement of the screw and its cone point 76 functions to shift the balls 86 radially and angularly outward in their respective channels 85 so that the balls 86 will co-act with the bevelled face 84 to shift the collar 80 and its disc 83 inwardly into frictional engaging relation with the disc 18. The outer end of the spring 72 abuts the inner end of the radial pins 81 and thereby co-acts with the collar 80 to disengage the clutch discs 83 and 18 when the screw 74 is released by left rotation of the ferrule 62.

As illustrated in Fig. 5 the inner face of the collar 80 is provided with ratchet teeth or serrations 87. The bearing 11 is formed with an eccentric bore 88, which intersects an annular peripheral recess 89, and carried in the bore 88 for longitudinal movement is a click pin 90. The mid portion of the pin 90 is formed with a slot 91 and its outer end is beveled off to correspond with the ratchet teeth 87 with which it engages. The recess 89 carries a spiral spring 92 one end of which is seated in the slot 91 and the other end of which bears against the side of the recess 89 so as to yieldably press the pin 90 against the ratchet teeth 87 when the clutch is approaching engagement or disengagement and the spool and its bearing 11 are rotated in the unwinding direction of travel.

The clutch or drag adjusting gear train operates in a simple manner only when adjustments are being made, and in this instance at three to one ratio to drive the adjusting screw 74. Nevertheless, as the ferrule 62 and handle 60 are firmly gripped by the operator's hand and the gear train is swung about the crank axis, it functions as an epicyclical train and tends to drive the adjusting screw 74 at a two to one ratio, as one revolution is lost in driving the spool shaft which is driven at a two to one ratio. Therefore, the two gear trains co-act while driving the spool shaft 8 and its connected members.

Obviously the ferrule 62 and the screw 74 rotate in the same direction, therefore if the ferrule is given a substantial left turn the resultant is idle rotation of the screw 74 which is indicated by a slight clicking sound of the threads 74 clocking over the outer ends of the threads 73 under the urge of spring 72. Obviously this clocking sound serves to indicate free spool position as the collar and its ratchet 87 have moved longitudinally out of engagement with the click pin 90 as shown in Fig. 1.

On the contrary if the ferrule is given a slight right turn the shoulder which is formed on the periphery of the cone 76 is advanced at the ratio of three threads to one complete turn of said ferrule 62, thus advancing the click ratchet 87 and the disc 83 through the medium of the balls 86, from the freespool position to the clicking position.

This three to one gear ratio between the ferrule 62 and the adjusting screw affords the advantage of greater longitudinal movement of the click and clutch parts relative to the rotational movement of said ferrule. Therefore if the ferrule is given another slight right turn the disc 83 is advanced to its engaging position. Referring now to Fig. 1, let it be assumed that screw 74 is rotated so that it moves inwardly. The uppermost ball 86 shown in Fig. 2 will then move relative to the inclined surface of the cone 76 on the tip of the screw 74 towards the base of such cone. During that portion of the movement in which the ball contacts the inclined surface of the cone the ratio between the inward movement of the screw and the outward movement of the ball will remain constant, but after the ball reaches a point where the contact is made along a slightly tapered portion 93 on the screw separating the cone 76 from the adjoining cylindrical surface of the screw the ball will move upwardly at a retarded ratio.

With this arrangement of parts the desired amount of friction or drag may be easily and accurately controlled with the minimum of effort on the part of the operator by the manipulation of the ferrule 62, which is most conveniently positioned in the operator's hand.

The peripheral support 19 permits the disc 18 and 83 to slightly deflect under the urge of screw 74 and through its affected parts as before described. The resiliency of the discs being equal therefore this deflection is accordingly equal, thus assuring a uniform frictional contact throughout their co-acting surfaces.

As illustrated in the group of assemblies shown in Fig. 7 this reel structure affords most advantageous quick take apart features for inspection and oiling.

For instance, if the screw 74 is engaged with the head 22 by a right turn of ferrule 62, the spring 77a being retained on its shaft 78 by its own tension, obviously there are no loose parts to be lost. Therefore, the cap 5 or 6 may easily be detached by left rotation thereof, and the spool assembly with its united screw 74 may be easily and quickly removed from the frame.

The operation of the invention is as follows:

The handle or ferrule is independently rotated to the left to actuate the clutch through the train of gears in the crank until a slight clicking sound is heard, which as stated indicates free spool position, and the line is paid out by casting if desired. In the event of an instant catch and at which time the lien is rapidly carried out by the pull of the fish, the frictional resistance of the clutch may be applied and increased by reverse or right rotation of the handle, which movement also engages the click.

Moreover, as the line is being carried out the serrations 87 on collar 80 and the crank will be held against reverse movement by the ratchet and pawl 52, which effects operation of the click pin 90 as it co-acts with the stationary serrations 87. Thus variations in the sound of the click will serve to indicate corresponding variations in the speed of line travel and the clutch is accordingly adjusted to provide the desired amount of friction in the drag.

In event the line tension is relaxed or released and it is desired to wind the line on the spool the clutch 83 is placed in position to effect tight engagement between the spool and shaft by turning the handle 62 to the right, whereupon the crank is rotated in its forward winding direction to effect rotation of the clutch 83 through the gear train in the reel frame.

Since the click pin 90 is engaged coincident with the clutch 83, it therefore rotates as a unit with the spool, consequently the click is inoperative when the line is being reeled in.

When the clutch element is adjusted in a position midway between free spool and frictional engagement, the spool is free to rotate only in the unwinding direction under a slight resistance of the click and its spring 92 which are carried around the ratchet teeth 87 by the spool bearing 11. Thus the click operates in conventional manner for still fishing.

The handle 62 is most conveniently located, and the three to one gear ratio of the clutch and click mechanism facilitate quick engagement of the click, therefore it may be instantly applied when casting the line and the resistance thereof being suitable the same may be utilized as a brake to prevent back lashing of the line.

What I claim is:

1. In a fishing reel, a frame, a spool revolubly carried on said frame, a diaphragmatical clutch element engageable with said spool, means for driving said element including a crank, a turnable cranking handle on the outer end of said crank, and means connecting with said handle and operable by the rotation thereof for placing said clutch element in and out of operative connection with said spool.

2. In a fishing reel, a frame, a spool revolubly carried on said frame, a diaphragmatical clutch element engageable with said spool, means for driving said element including a crank, a turnable handle on said crank, a screw provided with a cone, the cone adapted to actuate said element, and means connecting with said handle for shifting said screw by the rotation of said handle to place said clutch element in and out of operative connection with said spool.

3. In a fishing reel, a frame, a spool revolubly carried by said frame, a clutch element engageable with said spool, means for driving said element including a crank, means for restraining reverse movement of said element, a turnable handle on said crank, and means connected with said handle and operable by the rotation thereof for placing said clutch element in and out of operative connection with said spool.

4. In a fishing reel, a frame, a spool revolubly carried by said frame, a combined click and clutch element engageable with said spool, means for driving said element including a crank, means for restraining reverse movement of said element, a turnable handle on said crank, and means connected with said handle and operable by the rotation thereof for placing said element in and out of operative connection with said spool.

5. In a fishing reel, a frame, a spool carried by said frame, a clutch element including a resilient disc engageable with said spool, a threaded member longitudinally movable with respect to said spool, adjusting balls intermediate said disc and said threaded member and shiftable therebetween, means for driving said element including a crank, a turnable handle on said crank, and means connecting said threaded member with said handle and operable by the rotation thereof for shifting said disc through the medium of said balls for placing said clutch element in and out of operative connection with said spool.

6. In a fishing reel, a spool, a rotatable shaft on which said spool is rotatably mounted, adjusting balls carried in said shaft, a clutch element shiftable longitudinally on said shaft, means for driving said shaft including a crank, a turnable handle on said crank, and means connecting with said handle and operable by independent rotation thereof for adjusting said balls and placing said clutch element in and out of operative connection with said spool.

7. In a fishing reel, a spool, a click embodied in said spool, a rotatable shaft on which said spool is rotatably mounted, a clutch element including a click member shiftable on said shaft, means for driving said clutch element including a crank, means for preventing reverse movement of said shaft, a turnable handle on said crank, and means connected with said handle and operable by the rotation thereof for placing said clutch element and click member in and out of operative engagement with said spool and click.

8. In a fishing reel, a spool, a rotatable shaft on which said spool is rotatably mounted, angular ball channels enclosing shiftable balls in said shaft, a clutch element shiftable longitudinally on said shaft, means for driving said element including a crank, a turnable handle on said crank, and means connecting with said handle and operable by the rotation thereof for shifting said balls and placing said clutch element in and out of operative connection with said spool.

9. In a fishing reel, a spool, a rotatable shaft on which said spool is rotatably mounted, a diaphragm disc carried by its periphery on said spool, a resilient disc shiftable on said shaft, a threaded member coaxial with said shaft, shiftable balls intermediate said diaphragm disc and said threaded member, means for driving said resilient disc including a crank, a turnable handle on said crank, and means connecting said handle with said threaded member and operable by the rotation of said handle for shifting said balls and thereby shifting said resilient disc to frictional engaging and disengaging position with said diaphragm disc.

10. In a fishing reel, a frame, a spool on said frame provided with a disc, a clutch element including a disc engageable with said first mentioned disc, a gear in driving connection with said element, pinion gears rotatably mounted on said frame and in mesh with said gear, an internal gear rotatably carried by said frame and in mesh with said pinion gears, a crank connected with said internal gear, a turnable handle on said crank, and means connecting with said handle for engaging and disengaging said discs on turning said handle.

11. In a fishing reel, a frame, a spool carried by said frame, a shaft carried by said frame extending into said spool, a clutch element shiftable longitudinally of said shaft into and out of engagement with the end of said spool, a crank on said frame, means for driving said shaft from said crank, a turnable handle on said crank, and means connecting with said handle and operable by the rotation thereof for longitudinally shifting said clutch element in and out of operative connection with said spool.

12. In a fishing reel, a frame, a shaft carried by said frame, a free spool journaled on said shaft, a clutch element interposed between said shaft and spool, a screw operatively connected to said clutch element, a crank on said frame, gear connections between said crank and shaft for revolving the latter, a turnable handle on said crank, means connecting with said handle and operable by the rotation thereof for actuating said screw to place said clutch element in and out of operative connection between said shaft and spool, and means comprising a spring for resisting inward movement of the screw and for urging it outwardly to clutch releasing position.

13. In a fishing reel, a frame, a spool on said frame, a clutch mechanism engageable with said spool, a gear embodied in said mechanism, an internal gear, pinion gears rotatably mounted on said frame and in mesh with the gear in said mechanism and said internal gear, means comprising bearings for supporting said internal gear, a crank connected with said internal gear, a turnable handle on said crank, and means including a screw having a tapered end and a plurality of cooperating balls, connecting with said handle and operable by rotation thereof for engaging and disengaging said clutch mechanism with said spool.

14. In a fishing reel, a spool, a cylindrical frame having exteriorly threaded end rings for housing said spool, internally threaded caps removably threaded over said end rings for rotatably supporting said spool, an exteriorly threaded crank shank concentrically carried by one of said end caps, and an internally threaded crank removably threaded thereon; the threads of one of said caps and the crank arranged to screw onwardly and self lock under onwardly torsional stresses of said crank.

15. In a fishing reel, a frame, a shaft carried by said frame, a spool journaled on said shaft, a clutch member carried by said spool, a collar shiftable longitudinally of said shaft, a clutch member on said collar engageable with said first named clutch member, a screw carried by said shaft adjustable longitudinally thereof having a cone on one end thereof, a series of balls interposed between said cone and one end of said collar, a crank, gear connections between said crank and shaft, and means on said crank for adjusting said screw to shift said balls and said collar to effect interengagement of said clutch members.

16. In a fishing reel, a frame, a shaft carried by said frame, a spool journaled on said shaft, a clutch member carried by said spool, a collar shiftable longitudinally of said shaft, a clutch member on said collar engageable with said first named clutch member, a screw carried by said shaft adjustable longitudinally thereof having a cone on one end thereof, a series of balls interposed between said cone and one end of said collar, a crank, gear connections between said crank and shaft, means on said crank for adjusting said screw to shift said balls and said collar to effect interengagement of said clutch members on advance of said screw, and spring means for shifting said collar to disengage said clutch members on retraction of said screw.

17. In a fishing reel, a spool, a cylindrical frame having an exteriorly threaded end ring for housing said spool, an internally threaded cap removably threaded over said end ring, a spool supporting shaft rotatably connected with the cap, an exteriorly threaded shank concentrically carried by said cap, means comprising gears for interconnecting the shank and shaft for opposite rotation, an internally threaded crank removably threaded over said shank, and means intermediate said shank and said cap for restraining relative movement thereof in one direction.

18. In a fishing reel, a spool, a cylindrical frame having outwardly curved pillars and exteriorly threaded end rings integral therewith, internally threaded caps removably threaded over said rings for housing the spool, a spool supporting shaft having its ends rotatably carried by the caps, a crank concentrically carried by one of said caps, means comprising an internal gear and pinions for effecting opposite rotation of the crank and shaft, and means intermediate one of said caps and the crank for restraining relative movement thereof in one direction.

FRANK A. KING.